United States Patent
Fawcett et al.

(10) Patent No.: US 10,484,429 B1
(45) Date of Patent: Nov. 19, 2019

(54) AUTOMATED SENSITIVE INFORMATION AND DATA STORAGE COMPLIANCE VERIFICATION

(71) Applicant: Amazon Technologies, Inc., Seattle, WA (US)

(72) Inventors: John Kenneth Fawcett, Lauder (GB); Joe Jony Jeyaratnam, Edinburgh (GB); Pramod Raghavendran, Seattle, WA (US); Martin Christopher Hare Robertson, Edinburgh (GB); Keerat Singh Sharma, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 15/335,175

(22) Filed: Oct. 26, 2016

(51) Int. Cl.
*H04L 29/06* (2006.01)

(52) U.S. Cl.
CPC ...... *H04L 63/20* (2013.01); *G06F 2221/2111* (2013.01)

(58) Field of Classification Search
CPC .................. H04L 63/20; G06F 2221/2111
See application file for complete search history.

(56) References Cited

U.S. PATENT DOCUMENTS

| | | | | |
|---|---|---|---|---|
| 7,774,743 B1* | 8/2010 | Sanchez | ................. | G06Q 10/06 717/103 |
| 7,870,075 B1* | 1/2011 | Sabet | .................... | G06F 21/105 380/201 |
| 8,132,260 B1* | 3/2012 | Mayer | .................... | G06F 21/577 726/11 |
| 8,214,906 B2* | 7/2012 | Goddard | ............... | G06F 11/008 726/22 |
| 8,584,247 B1* | 11/2013 | Patil | ..................... | G06Q 10/101 726/25 |
| 8,594,645 B2* | 11/2013 | Yang | ....................... | G06F 9/453 455/418 |
| 8,676,746 B2* | 3/2014 | Tsai | ..................... | G06F 11/0709 707/603 |
| 8,874,685 B1* | 10/2014 | Hollis | ..................... | H04L 41/00 709/206 |
| 8,918,632 B1* | 12/2014 | Sartor | .................... | G06F 21/53 713/152 |

(Continued)

OTHER PUBLICATIONS

Lindorfer et al., Marvin: Efficient and Comprehensive Mobile App Classification Through Static and Dynamic Analysis, IEEE, 2015.*

(Continued)

*Primary Examiner* — David Garcia Cervetti
(74) *Attorney, Agent, or Firm* — Eversheds Sutherland (US) LLP

(57) ABSTRACT

Systems, methods, and computer-readable media are disclosed for automated sensitive information and data storage compliance verification. In one embodiment, an example method may include determining a software application stored at a database, determining software code of the software application, and determining that the software code includes a function that accesses critical user information. Example methods may include determining a risk score for the software application based at least in part on the function, and determining a compliance level for the software application based at least in part on the function.

20 Claims, 6 Drawing Sheets

(56) References Cited

U.S. PATENT DOCUMENTS

| | | | | |
|---|---|---|---|---|
| 8,930,906 | B2* | 1/2015 | Carter | G06F 8/33 |
| | | | | 707/609 |
| 8,972,571 | B2* | 3/2015 | Nappier | H04L 63/08 |
| | | | | 709/220 |
| 8,990,392 | B1* | 3/2015 | Stamos | H04L 43/08 |
| | | | | 709/224 |
| 9,015,832 | B1* | 4/2015 | Lachwani | G06F 21/52 |
| | | | | 726/22 |
| 9,098,333 | B1* | 8/2015 | Obrecht | G06F 9/50 |
| 9,124,585 | B1* | 9/2015 | Yen | H04L 61/10 |
| 9,152,694 | B1* | 10/2015 | Padidar | G06F 21/51 |
| 9,264,395 | B1* | 2/2016 | Stamos | H04L 61/1511 |
| 9,448,787 | B2* | 9/2016 | Rosomoff | G06F 8/70 |
| 9,495,538 | B2* | 11/2016 | Schneider | G06F 21/52 |
| 9,591,016 | B1* | 3/2017 | Palmieri | H04L 63/1433 |
| 9,646,275 | B2* | 5/2017 | Nielsen | G06Q 10/06 |
| 9,690,936 | B1* | 6/2017 | Malik | G06F 21/562 |
| 9,729,709 | B1* | 8/2017 | Edwards | H04M 11/00 |
| 9,787,709 | B2* | 10/2017 | Doubleday | H04L 63/1433 |
| 9,813,450 | B1* | 11/2017 | Wasiq | H04L 63/20 |
| 9,910,972 | B2* | 3/2018 | Raghuram | H04L 67/1097 |
| 9,922,035 | B1* | 3/2018 | Ulman | G06F 16/183 |
| 10,284,585 | B1* | 5/2019 | Kennedy | G06F 16/24578 |
| 10,346,282 | B2* | 7/2019 | Kaulgud | G06F 11/3612 |
| 2004/0221176 | A1* | 11/2004 | Cole | G06F 21/577 |
| | | | | 726/25 |
| 2007/0094281 | A1* | 4/2007 | Malloy | G06Q 10/06 |
| 2007/0239495 | A1* | 10/2007 | Osborn | G06Q 10/00 |
| | | | | 705/7.28 |
| 2008/0027965 | A1* | 1/2008 | Garrett | G06F 16/283 |
| 2008/0147589 | A1* | 6/2008 | Ashcraft | G06F 8/71 |
| | | | | 706/53 |
| 2008/0207327 | A1* | 8/2008 | Van Luchene | A63F 13/12 |
| | | | | 463/42 |
| 2008/0209561 | A1* | 8/2008 | Alagna | G06F 21/554 |
| | | | | 726/23 |
| 2009/0313615 | A1* | 12/2009 | Joshi | G06F 8/443 |
| | | | | 717/154 |
| 2011/0060612 | A1* | 3/2011 | Mercer | G06Q 10/06 |
| | | | | 705/7.37 |
| 2011/0067005 | A1* | 3/2011 | Bassin | G06F 11/008 |
| | | | | 717/127 |
| 2011/0126111 | A1* | 5/2011 | Gill | G06F 21/55 |
| | | | | 715/736 |
| 2012/0011559 | A1* | 1/2012 | Miettinen | G06F 21/31 |
| | | | | 726/1 |
| 2012/0110174 | A1* | 5/2012 | Wootton | G06F 21/564 |
| | | | | 709/224 |
| 2012/0185910 | A1* | 7/2012 | Miettinen | G06F 21/31 |
| | | | | 726/1 |
| 2012/0216037 | A1* | 8/2012 | Simcoe | H04L 9/3236 |
| | | | | 713/168 |
| 2012/0216244 | A1* | 8/2012 | Kumar | G06F 21/31 |
| | | | | 726/1 |
| 2013/0047240 | A1* | 2/2013 | Radhakrishnan | H04L 63/0807 |
| | | | | 726/9 |
| 2013/0104236 | A1* | 4/2013 | Ray | H04L 63/1433 |
| | | | | 726/25 |
| 2013/0198797 | A1* | 8/2013 | Raghuram | G06F 21/57 |
| | | | | 726/1 |
| 2013/0227683 | A1* | 8/2013 | Bettini | G06F 21/57 |
| | | | | 726/22 |
| 2013/0339457 | A1* | 12/2013 | Freire | G06Q 50/01 |
| | | | | 709/206 |
| 2014/0019196 | A1* | 1/2014 | Wiggins | G06Q 10/0635 |
| | | | | 705/7.28 |
| 2014/0109191 | A1* | 4/2014 | Raghuram | H04L 67/1097 |
| | | | | 726/4 |
| 2014/0236668 | A1* | 8/2014 | Young | G06Q 10/10 |
| | | | | 705/7.28 |
| 2014/0282824 | A1* | 9/2014 | Lango | H04L 63/20 |
| | | | | 726/1 |
| 2014/0283085 | A1* | 9/2014 | Maestas | H04L 63/0236 |
| | | | | 726/25 |
| 2014/0331277 | A1* | 11/2014 | Frascadore | H04L 63/20 |
| | | | | 726/1 |
| 2015/0012645 | A1* | 1/2015 | Harris | H04W 4/90 |
| | | | | 709/224 |
| 2015/0235207 | A1* | 8/2015 | Murphy, Jr. | G06Q 20/382 |
| | | | | 705/44 |
| 2015/0235219 | A1* | 8/2015 | Murphy, Jr. | G06Q 20/4016 |
| | | | | 705/75 |
| 2015/0235220 | A1* | 8/2015 | Murphy, Jr. | G06Q 20/4016 |
| | | | | 705/75 |
| 2015/0244743 | A1* | 8/2015 | Jagad | G06F 21/577 |
| | | | | 726/1 |
| 2015/0332184 | A1* | 11/2015 | Osborn | G06Q 10/00 |
| | | | | 705/7.28 |
| 2016/0088021 | A1* | 3/2016 | Jayanti Venkata | G06F 8/60 |
| | | | | 726/1 |
| 2016/0099963 | A1* | 4/2016 | Mahaffey | H04L 63/0227 |
| | | | | 726/25 |
| 2016/0154960 | A1* | 6/2016 | Sharma | G06F 21/56 |
| | | | | 726/25 |
| 2016/0224803 | A1* | 8/2016 | Frank | G06F 21/6245 |
| 2016/0300252 | A1* | 10/2016 | Frank | G06Q 30/0203 |
| 2016/0309122 | A1* | 10/2016 | Kingery | H04W 4/60 |
| 2016/0321582 | A1* | 11/2016 | Broudou | G06Q 10/0635 |
| 2016/0335425 | A1* | 11/2016 | Liu | G06F 21/44 |
| 2016/0373478 | A1* | 12/2016 | Doubleday | H04L 63/1433 |
| 2017/0046246 | A1* | 2/2017 | Kaulgud | G06F 11/3612 |
| 2017/0060897 | A1* | 3/2017 | Madaan | G06F 16/1774 |
| 2017/0141961 | A1* | 5/2017 | Cao | H04L 41/0869 |
| 2017/0161366 | A1* | 6/2017 | Maitra | G06F 16/3344 |
| 2017/0200137 | A1* | 7/2017 | Vilmont | G06Q 20/10 |
| 2017/0220964 | A1* | 8/2017 | Datta Ray | H04L 63/1433 |
| 2017/0249644 | A1* | 8/2017 | DiMaggio | G06Q 30/018 |
| 2017/0269954 | A1* | 9/2017 | Hardy | G06F 9/45558 |
| 2017/0269955 | A1* | 9/2017 | Hardy | G06F 9/45558 |
| 2017/0286689 | A1* | 10/2017 | Kelley | G06F 21/577 |
| 2017/0287034 | A1* | 10/2017 | Barday | G06Q 10/0635 |
| 2017/0302701 | A1* | 10/2017 | Phanse | H04L 63/20 |
| 2017/0353482 | A1* | 12/2017 | Sommer | G06Q 20/4016 |
| 2017/0357502 | A1* | 12/2017 | Barday | G06F 8/70 |
| 2017/0374061 | A1* | 12/2017 | Jayanti Venkata | G06F 8/60 |
| 2018/0032944 | A1* | 2/2018 | Sarvana | G06Q 10/063112 |
| 2018/0034703 | A1* | 2/2018 | Anholt | H04L 12/4641 |
| 2018/0131714 | A1* | 5/2018 | Maestas | H04L 63/1433 |
| 2018/0316715 | A1* | 11/2018 | Liu | G06F 8/42 |
| 2019/0050205 | A1* | 2/2019 | Barday | G06F 8/20 |

OTHER PUBLICATIONS

Gates et al., Generating Summary Risk Scores for Mobile Applications, IEEE, May 2014.*

* cited by examiner

AUTOMATED SENSITIVE INFORMATION AND DATA STORAGE COMPLIANCE VERIFICATION

BACKGROUND

Consuming content on electronic devices or otherwise engaging in electronic communication may involve collection or transmission of sensitive information. For example, information that can identify a particular electronic device, or a particular user, may be sent from one device to another. Such information may be sensitive due to its ability to be linked to a particular device or user. Certain parties may have contractual obligations or other concerns regarding use or management of sensitive information. However, determining that contractual obligations or other concerns, such as privacy concerns, are satisfied may be a time-consuming manual process, and therefore, verification of compliance may be infrequent.

Figure 1:
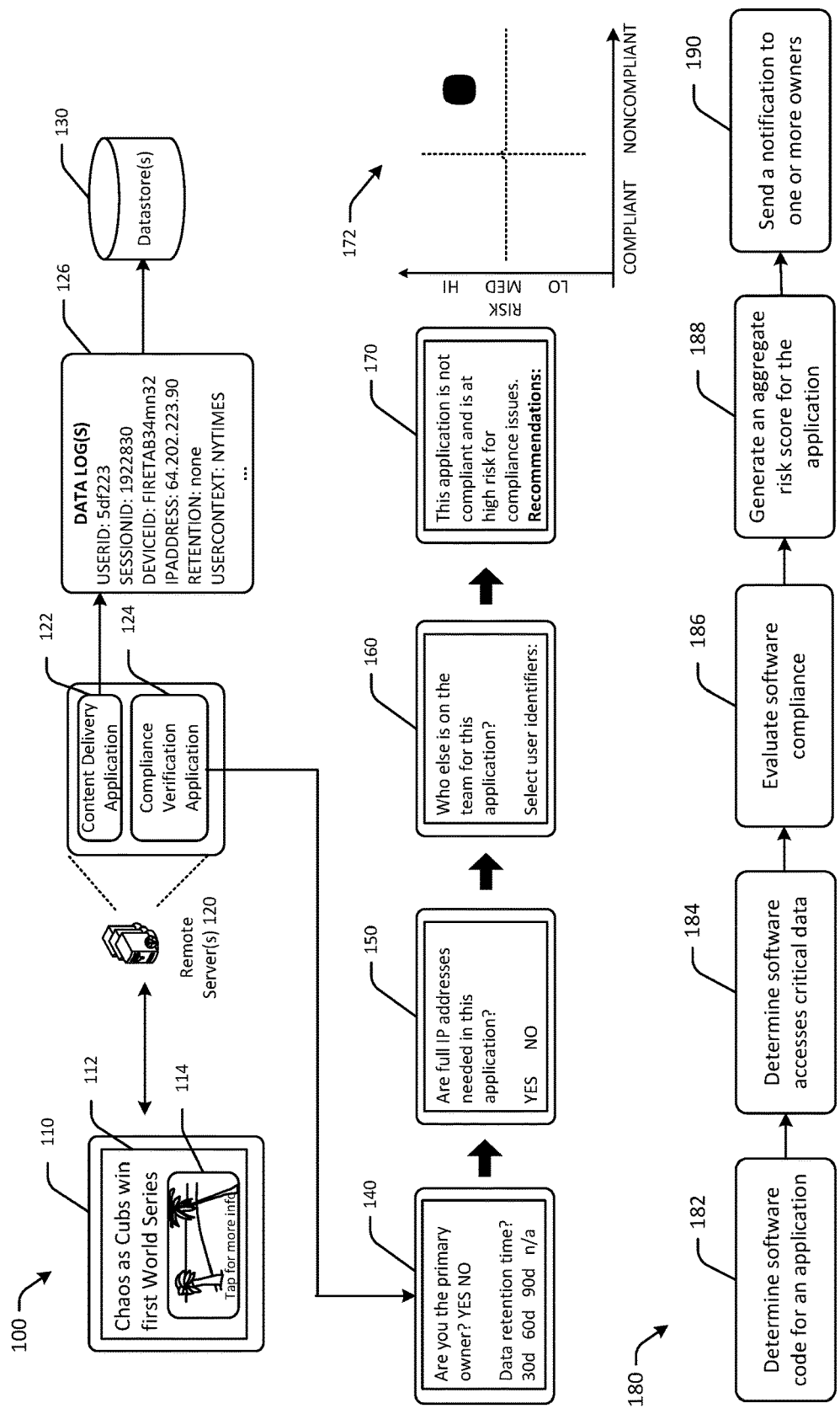
FIG. 1 is a hybrid system and process diagram illustrating automated sensitive information and data storage compliance verification in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be used to consume content, such as video, text, images, and other content. To present content, electronic devices may communicate with one or more sources of content, such as servers. In communicating with other devices, certain sensitive information may be shared with the other devices. Sensitive information may include personally identifiable information, such as user identifiers, internet protocol (IP) addresses, device identifiers, and other personally identifiable information, as well as other sensitive or critical information, such as data associated with a particular user or device. While sensitive information may be shared with other entities and/or devices, those entities or devices may subsequently store or otherwise retain the sensitive information, or share the sensitive information with other parties, creating a security risk and/or a privacy risk in the event of unauthorized access of the sensitive information.

To reduce or prevent the risk of unauthorized access of sensitive information, certain entities may create contractual obligations regarding the use and/or retention of sensitive information, in addition to compliance regulations that may be the result of, in one example, privacy protection laws. For example, a contractual obligation or another regulation may limit a length of time certain data can be retained, such as an IP address of a user device. To ensure software application compliance with such obligations or regulations regarding sensitive information, the software application may be analyzed or otherwise checked to determine whether or not the software application has a compliance issue, or fails to comply with a certain obligation or regulation. A quantified risk of noncompliance with a certain obligation or regulation may also be used to indicate a likelihood of noncompliance for the software application. Such analysis of software applications may be time consuming and labor intensive if performed manually.

Embodiments of the disclosure may automatically verify whether software applications are in compliance with one or more obligations or regulations regarding sensitive information and/or data retention. Certain embodiments may verify compliance of software applications periodically or at predetermined time intervals, so as to signal potential noncompliance before software application development is complete, thereby reducing an amount of rework that may need to be done to bring an application into compliance. This is distinguished over manual verification, which, due to its time consuming and labor intensive nature, may be performed infrequently, such as annually, or only before an application is deployed. As a result, embodiments of the disclosure may proactively identify potential risks for noncompliance and may alert developers or owners of applications as to the potential risk. Certain embodiments may further generate recommendations for owners or developers of the application to mitigate or reduce a risk of noncompliance.

In some embodiments, a risk score may be generated for software applications indicative of a likelihood that execution of the software application will violate one or more compliance rules. Risk scores may be generated periodically or after the software application is modified. Risk scores may be used to classify or categorize the software application as, for example, a high risk application indicating that noncompliance is likely and a change should be made to the software application, a medium risk application indicating the potential of noncompliance and requesting manual review, and a low risk application indicating that other software applications should be prioritized for manual compliance verification.

Embodiments of the disclosure may provide continuous or near-continuous (e.g., daily, etc.) verification of compliance for software applications, as opposed to the infrequent and non-scalable compliance verification provided by manual review. Such verification may provide self-serve automated assessment and related risk reduction recommendations. Embodiments of the disclosure may increase security of products and reduce a risk of unintended access to private data. Further, the automated processes of the disclosure may improve scalability while improving security and reducing an amount of data loss or disclosure in the event of a breach.

For example, a software application may be used to present content at user devices. As part of the process to present content, the software application may receive sensitive information, such as website context of a website at which the content is to be rendered. However, there may be a bidding process for the right to present content, and the software application may not have submitted the winning bid. The software application may still have the website context information, as well as other information like a website address, a device identifier, etc. The user of the user device may not be aware that the website context or other information was sent to a third party, such as the software application. As part of an agreement, such as a contractual agreement, between an entity associated with the software application and an entity associated with the slot at which content was to be presented (which may or may not be the same entity as the website owner), the entity associated with the software component may be obligated to delete the website context information within a certain timeframe, such as 24 hours or 30 days, etc.

Certain embodiments may analyze the software application and may determine a risk score for the software application based at least in part on a number of factors, such as one or more primary and/or inferred owners of the software application, permissions to access associated with the software application, data types accessed or handled by the software application, data retained by and/or datastores used by the software application, a risk score history or historical risk scores and/or compliance issues associated with the software application, and/or other factors. Risk scores may indicate the likelihood of a compliance risk, which may be the potential for a compliance issue to actually occur. Risk scores may be determined for individual components of software applications and/or for an entire software application. Applications may be groups of one or more components that correspond to the provision of a service. Risk scores for software applications may be determined based at least in part on risk subscores generated for software components forming the software application.

A compliance level, or a determination of compliance or noncompliance, may also be determined by certain embodiments. Compliance levels may be determined for individual components and/or for software applications. Compliance levels may be indicative of a sliding scale along which some portions of a software application may be compliant, while other portions may be noncompliant, indicating that the compliance level of the software application is at a partially compliant level. Some software applications may be fully compliant, whereas other software applications may be fully noncompliant.

Compliance levels may be determined based at least in part on the presence of a compliance issue caused by one or more components of a software application. A compliance issue may be a violation of a policy or an unintended outcome that may be the result of execution of certain software applications or components. For example, logging a full customer IP address may be a compliance issue, whereas a software application developed by an unexperienced team may have high risk of noncompliance.

Risk scores and/or compliance levels may be used to categorize or classify software applications as high, medium, or low risk applications. Such categorization may allow for prioritization of software applications for manual review and/or further investigation.

This disclosure relates to, among other things, systems, methods, computer-readable media, techniques, and methodologies for automated sensitive information and data storage compliance verification. Embodiments may automatically analyze software applications and related data, such as design documents, to identify potential risks for noncompliance, and may generate notifications and/or recommendations to mitigate risks. As a result, developers or owners of software applications may be able to address potential noncompliance issues before deployment of software applications, and potentially before major rework or redesign is needed. By classifying or categorizing software applications based at least in part on compliance and/or risk of noncompliance, embodiments of the disclosure may facilitate manual review of software applications by prioritizing using risk categories and/or compliance levels.

Referring to FIG. 1, an example environment 100 illustrating automated sensitive information and data storage compliance verification is depicted. In the example of FIG. 1, a user device 110 may be in communication with one or more remote servers 120. A user may use the user device 110 to consume digital content 112. For example, the user may be consuming digital content 112 related to the World Series on the user device 110. The digital content 112 may include an available content delivery slot 114, that may be used to present targeted content at the user device 110. To determine what content to present at the available content delivery slot 114, a publisher server or server associated with the digital content 112 may conduct an auction or another process.

In the example of FIG. 1, the remote server 120 may include a content delivery application 122. The content delivery application 122 may communicate with other servers to arrange for presentation of digital content in available content delivery slots. In some embodiments, the content delivery application 122 may receive bid requests for, for example, the available content delivery slot 114, and may submit bids in response to the bid request. The bid request may include information such as a device identifier for the user device 110, a user identifier for a user account associated with the user device 110, context information, which in FIG. 1 may include "World Series" or other keywords, a web address, or other context, and other information.

The content delivery application 122 may be used to facilitate presentation of certain content, such as targeted content, at user devices. Accordingly, the content delivery application 122 may submit a bid in response to the bid request. The bid may be a winning bid. As a result, the content delivery application 122 may send a content identifier for content to be presented at the available content delivery slot 114. In the example of FIG. 1, the presented content may be a beach scene with a link to additional information.

The content delivery application 122 may receive the information associated with the bid request and may store or process the information regardless of whether or not a bid submitted by the content delivery application 122 was a winning bid, or whether the content delivery application 122 submitted a bid at all. For example, the content delivery application 122 may generate and/or store one or more data logs 126. The data log 126 may include some or all of the information associated with the available content delivery slot 114. For example, the data log 126 may include a user identifier, a session identifier (e.g., browser session, etc.), a device identifier, an internet protocol (IP) address, a user context (e.g., context of the content delivery slot, etc.), a length of time the data is to be retained (e.g., retention length, etc.), and/or other information. The information in the data log 126 may be encrypted or unencrypted, hashed, anonymized, etc.

The content delivery application 122 may store the data log 126 at one or more datastores 130. The datastore 130 may have independent data retention policies and/or may retain the data log 126 for a retention length indicated by the data log 126 or the content delivery application 122, or may retain the data log 126 for another length of time.

A compliance verification application 124 may be stored at, or executed by, the remote server 120. The compliance verification application 124 may be configured to determine compliance and/or risk of one or more software components or software applications. The software components or applications may be stored at the remote server 120 or at another device. The compliance verification application 124 may be executed periodically, after certain time intervals, or may be triggered by a change to one or more software components or applications. For example, the compliance verification application 124 may verify compliance of the content delivery application 122.

In some embodiments, the compliance verification application 124 may determine compliance of the content delivery application 122 via interaction with an owner or manager of the content delivery application 122, while in other embodiments, the compliance verification application 124 may determine compliance automatically, or without user interaction. In FIG. 1, the compliance verification application 124 may determine compliance of the content delivery application 122 with user interaction.

For example, the compliance verification application 124 may generate a set of one or more questions pertaining to the content delivery application 122. The questions may relate to functions implemented or performed as a result of execution of the content delivery application 122. Responses to questions may be used to determine compliance and/or risk of noncompliance. Responses to certain questions may be weighted greater than other questions. The responses may be used to generate a risk score for the content delivery application 122.

At a first user interface 140, a first question may request information on the team that owns or manages the content delivery application 122. The team may be used to determine a risk score for the content delivery application 122. For example, if the team includes members that are inexperienced or do not have a minimum number of years of experience, the content delivery application 122 may be relatively more likely to be noncompliant than if the team had experienced members. Team composition as a whole may be considered, while in some embodiments, managers or team lead credentials and experience may be more heavily weighted than junior team members. In FIG. 1, experience and/or credentials of the primary owner of the application may be weighted relatively higher than other team members.

A second question at the first user interface 140 may ask how long certain data is retained. For example, if some or all data is stored for a certain length of time, that length of time may exceed an obligation or regulation. If the data is stored indefinitely, that may indicate potential noncompliance. Based at least in part on the data types accessed or stored by the content delivery application 122, the length of time data is retained may be factored into the risk score. In the illustrated example, the owner to whom the questions are presented may indicate the retention time for the data log 126 is indefinite.

At a second user interface 150, a first question may request a user to specify whether full IP addresses are needed for the content delivery application 122. For example, the compliance verification application 124 may determine, based at least in part on the data log 126, that the content delivery application 122 causes storage of the user's full IP address at the datastore 130. Therefore, the question at the second user interface 150 may be used to determine whether there is a reason or exception for why the complete IP address is being stored, so as to suggest whether any alternatives may be available. In the illustrated example, the owner to whom the question is presented may indicate the full IP addresses are not needed in the content delivery application 122.

At a third user interface 160, a first question may relate to other members of the team working on or managing the content delivery application 122. A user may be able to input or select one or more user identifiers for team members. The experience or credentials of the other team members may be factored into the risk score. In the illustrated example, the owner to whom the question is presented may indicate that the team includes three members. Experience levels, position titles, roles, and/or years of experience may be determined by the compliance verification application 124 for one or more, or each, of the three team members. Aggregate experience may be determined for the three members and/or for the team and the primary owner.

At a fourth user interface 170, a notification may be generated by the compliance verification application 124 and presented indicating that the content delivery application 122 is not compliant and is at high risk for compliance issues. The notification may include recommendations to correct the compliance issues, such as anonymizing the data log 126, storing a portion of the IP address instead of the full IP address, reducing a retention time of the data log 126, and other recommendations. The notification and/or recommendations may be based at least in part on responses to the questions, rules determined based at least in part on regulations and/or contractual obligations between involved entities, and other factors.

In other embodiments, there may be no questions sent to or presented to a user. Answers to questions may be automatically determined by the compliance verification application 124 (e.g., by analyzing the software code of the application being checked for compliance, etc.). For example, depending on permissions associated with an application that indicate data the application has access to, the compliance verification application 124 may determine whether full IP addresses are needed by the application. In one example, an application may have permission to access certain anonymized data, such as an anonymized internet protocol address. Similarly, depending on datastores used by an application and the respective datastore settings, the compliance verification application 124 may determine a retention length. The compliance verification application 124 may determine team credentials based at least in part on user identifiers that access or modify the application within a certain timeframe. Determinations may be made as to the type of data accessed by an application, whether the application has access to the type of data, and the reason why the application has access to the type of data.

The compliance verification application 124 may generate a risk score for the content delivery application 122. In FIG. 1, the risk score may be determined based at least in part on the data type accessed or handled by the content delivery application 122, an amount of data or data types accessed or handled by the content delivery application 122, a number of team members that own the content delivery application 122, an experience level of primary and/or inferred owners of the content delivery application 122, a retention time of data collected by the content delivery application 122, and/or other factors.

The compliance verification application 124 may categorize the content delivery application 122 based at least in part on the risk score. For example, a risk score between 0-3 may be a low risk application, a risk score equal to or greater than 4 and less than or equal to 7 may be a medium risk application, and a risk score between 8-10 may be a high risk application. Any suitable alphanumeric or other scale may be used to categorize or classify applications based at least in part on the risk score. The risk category may be used to determine which applications should be reviewed for compliance more often than others, and/or which applications should be flagged for manual review (e.g., high risk applications may be analyzed by the compliance verification application 124 more frequently than low risk applications, etc.).

The compliance verification application 124 may determine whether the content delivery application 122 is fully compliant, partially compliant, or noncompliant. If there are, for example, three areas of compliance that the content delivery application 122 is to comply with, such as data retention, access permissions, and amount of IP address, and the content delivery application 122 complies with all three, the content delivery application 122 may be fully compliant. If the content delivery application 122 complies with two of the three areas of compliance, the content delivery application 122 may be partially compliant. If the content delivery application 122 does not comply with any of the areas of compliance, the content delivery application 122 may be noncompliant.

If the content delivery application 122 is compliant, but is at risk for noncompliance, a notification indicating the risk may be generated and/or sent to one or more owners of the content delivery application 122. For example, the replacement of a team member for a critical role with a new inexperienced team member may increase the risk of noncompliance for the content delivery application 122, while the content delivery application 122 may still be in compliance at the time the new team member joins.

The compliance verification application 124 may generate a graph 172 of risk on one axis and compliance on another axis, so as to indicate where along the spectrum the content delivery application 122 falls. The graph 172 may provide a visual indication of a status of the content delivery application 122, which may be used by a user to determine a severity of issues with the content delivery application. For example, in FIG. 1, the graph 172 may indicate that the content delivery application 122 is partially compliant or noncompliant and is at high risk for noncompliance. The user may then review the content delivery application 122 manually.

The compliance verification application 124 may include computer-executable instructions that, when executed, perform a method 180 of automatically verifying compliance of sensitive information and data storage. The method 180 may include a first operation 182 of determining software code for an application. For example, the compliance verification application 124 may determine software code associated with the content delivery application 122. At a second operation 184, the compliance verification application 124 may determine that the software accesses critical data. For example, the compliance verification application 124 may determine that the content delivery application 122 accesses full IP addresses of user devices.

At a third operation 186, the compliance verification application 124 may evaluate software compliance. For example, the compliance verification application 124 may evaluate whether the content delivery application 122 complies with one or more obligations or regulations. The obligations or regulations may be different for different applications and may be based at least in part on the data types of data accessed or handled by the application, the entities involved in data transfer with the application, datastores used by the application, and other factors. For example, the compliance verification application 124 may determine that a function implemented by the software code of the content delivery application 122 accesses an IP address of a user device, such as the user device 110, that is accessing a remote server, such as the remote server sending the content 112. The compliance verification application 124 may determine that the function stores a complete IP address of the user device 110. The compliance verification application 124 may access the data log 126 of data stored as a result of the function, for example, by accessing the datastore 130. The compliance verification application 124 may determine that the data log 126 comprises the complete IP address of the user device 110.

At a fourth operation 188, the compliance verification application 124 may generate an aggregate risk score for the application. The aggregate risk score may be based at least in part on risk subscores for components of the application. For example, the compliance verification application 124 may determine an aggregate risk score for the content delivery application 122 based at least in part on respective risk subscores for a bidding component, a content selection component, and a targeting component. The targeting component may have a relatively higher risk subscore since the targeting component may access user specific information, while the bidding component may have a relatively lower risk subscore as it may not access user specific information. The compliance verification application 124 may determine that the software code includes a compliance issue, and may determine a first risk score for the software code based at least in part on the data log 126.

At a fifth operation 190, the compliance verification application 124 may send a notification to one or more owners. The notification may indicate compliance or noncompliance, compliance issues, risk scores, risk categories, request manual review, a graphical indicator of risk and compliance, recommendations to correct any compliance issues or reduce risks (e.g., delete or anonymize the complete IP address, etc.), and other information.

The compliance verification application 124 may monitor the content delivery application 122 for modifications and/or edits to the software code. The compliance verification application 124 may determine new risk scores and/or verify compliance for the content delivery application 122 periodically, after a predetermined length of time has passed after detecting a compliance issue, or after detecting a change in the software code. The compliance verification application 124 may determine that the software code has been modified, and may determine that the function has been modified to store a partial IP address instead of a complete IP address. The compliance verification application 124 may optionally determine that previously stored complete IP addresses have been deleted. The compliance verification application 124 may determine a second risk score for the software code and/or the content delivery application 122 after the software code has been modified, and may classify the software code as a medium risk application. The risk category may be reduced as a result of the change to the software code.

By automatically verifying compliance of sensitive information and data storage policies, embodiments of the disclosure may improve data security, increase cadence of compliance verification, reduce rework on software code, and improve computer performance by identifying compliance issues in a continuous or near-continuous verification process, thereby reducing an amount of data stored and/or accessed by computer devices.

The systems, methods, computer-readable media, techniques, and methodologies for automated sensitive information and data storage compliance verification may result in improved control and effectiveness of data storage and management systems, as well as improved and efficient use of computer resources and communications with data storage and management devices.

Example embodiments of the disclosure provide a number of technical features or technical effects. For example, in accordance with example embodiments of the disclosure, certain embodiments of the disclosure may modify functions of computers by editing or modifying software code that controls computer functions, so as to comply with obligations and/or regulations. As a result, data may be managed more securely and computer resources may be utilized more efficiently, due to a reduction in data stored, as well as an increase in security and/or other secure methods of data transmission. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
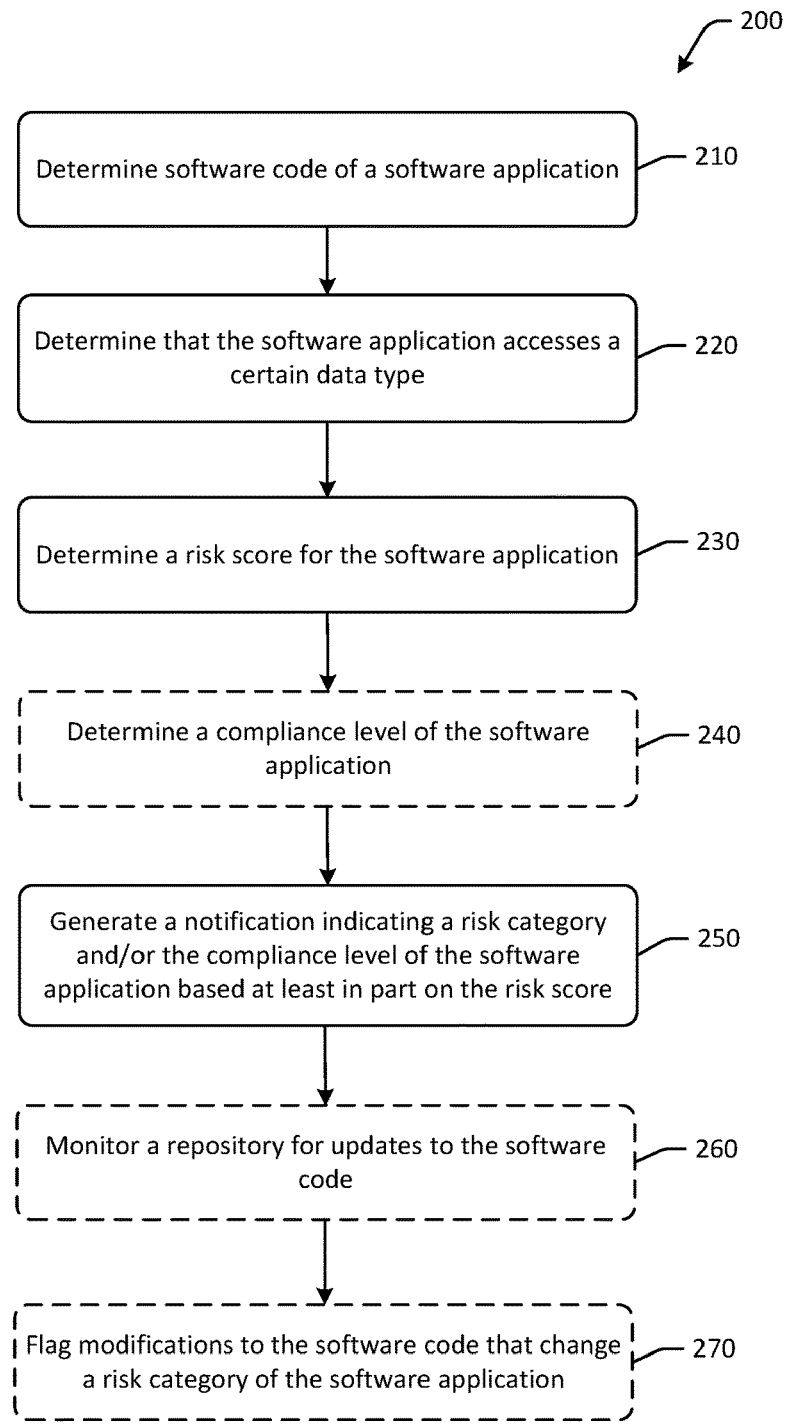
FIG. 2 is an example process flow diagram for automated sensitive information and data storage compliance verification in accordance with one or more embodiments of the disclosure.

Referring to FIG. 2, an example process flow 200 for automated sensitive information and data storage compliance verification in accordance with one or more embodiments of the disclosure is depicted. Although certain operations are illustrated as occurring separately in FIG. 2, some or all of the operations may occur concurrently or partially concurrently across one or more computer systems.

At block 210 of the process flow 200, software code of a software application is determined. For example, computer-executable instructions of one or more compliance verification module(s) stored at a remote server may be executed to retrieve, access, or otherwise determine software code of a software application for which compliance is to be verified. In some embodiments, other data or information related to a software application may be determined, such as design documents, update plans, and the like.

At block 220 of the process flow 200, a determination is made that the software application accesses a certain data type. The certain data type may be a data type that is associated with sensitive information. For example, computer-executable instructions of one or more compliance verification module(s) stored at a remote server may be executed to determine whether the software application is associated with or has permission to access a certain data type that is associated with sensitive information, or whether the software application requests, receives, and/or otherwise handles sensitive information. Sensitive information may include user information, personal identifiable information, IP addresses, such as a complete IP address, and other information, and may be different for different applications.

In some embodiments, a determination may be made as to whether the software application uses an anonymization algorithm and/or accesses certain data types. Datasets and data logs created by the software application may also be analyzed to determine what data is handled and/or stored by the software application and a retention time for stored data. Certain embodiments may identify application programming interfaces used by the software application, as well as data transmitted using the application programming interfaces to determine whether the software application accesses sensitive information.

At block 230 of the process flow 200, a risk score for the software application is determined. For example, computer-executable instructions of one or more risk assessment module(s) stored at a remote server may be executed to generate a risk score for the software application and/or a risk subscore for a component of the software application. In some embodiments, aggregated risk scores may be generated for software applications, and/or an aggregated risk score may be generated for a suite of software applications based at least in part on the risk scores of the individual software applications in the suite.

In one example, the risk score for the software application may be determined based at least in part on functions implemented or executed by software code of the software application. A function may, for example, cause access and/or retention of a full IP address. The risk score for the software application may be determined based at least in part on functions executed or implemented by the software application. Risk scores may be used to optionally categorize components or applications in different classes, such as high risk, medium risk, low risk, etc.

At optional block 240 of the process flow 200, a compliance level of the software application is determined. For example, computer-executable instructions of one or more compliance verification module(s) stored at a remote server may be executed to determine the compliance level of the software application. A compliance level may be indicative of whether an application is fully compliant, partially compliant, or noncompliant. Compliance levels may be determined for components of software applications and/or aggregate compliance levels for software applications based at least in part on compliance determinations for components.

In one example, embodiments of the disclosure may identify or determine one or more compliance rules for the software application. The compliance rules may be based at least in part on internal policies, external obligations, regulations, or other factors. Different applications may have different compliance rules, depending on data handled by the respective application. If it is determined that, for example, a particular function implemented by the software application violates a compliance rule, embodiments of the disclosure may determine that the software application has a compliance issue, or that a compliance issue exists.

An example compliance rule may be a limit of 90 days for data retention. Embodiments of the disclosure may determine that sensitive or critical information accessed or handled by the software application is stored at a datastore. A retention time of data stored at the datastore may be determined. If the retention time exceeds a retention time rule associated with the critical or sensitive information, such as retention of 120 days when the retention time rule is 90 days, or if the retention time is indefinite, it may be determined that there is a compliance issue with the software application. In some embodiments, a retention time of data may be determined based at least in part on the software code of the application, while in other embodiments, retention time may be determined based at least in part on a configuration of datastore(s) used by the software application.

At block 250 of the process flow 200, a notification indicating a risk category and/or the compliance level of the software application is generated based at least in part on the risk score. For example, computer-executable instructions of one or more compliance verification module(s) stored at a remote server may be executed to generate one or more notifications. Notifications may include graphical indicators, recommendations, such as retention time recommendations, IP address recommendations, datastore recommendations, and other recommendations. Notifications may include compliance issue notifications, risk scores, risk categories, changes in risk score or risk category, and other information.

At optional block 260 of the process flow 200, a repository is monitored for updates or changes to the software code. For example, computer-executable instructions of one or more risk comparison module(s) stored at a remote server may be executed to monitor for changes or updates to the software code of an application. Monitoring may be periodic or after a predetermined time interval has elapsed or may be triggered by an event (e.g., new software code is checked in at the repository, etc.). If there is an update or change to the software code, a second risk score may be determined and/or previous compliance issues may be checked for resolution. A risk category for the second risk score may be optionally determined. The second risk category may be compared to a previous risk category to determine if the update to the software code caused an increase or a decrease in risk score and/or risk category.

In such instances, a notification may be generated for an owner or other user of the software application indicating the change in risk score and/or risk category, as well as an indication of whether a previously identified compliance issue, if any, has been resolved with the updated software code.

At optional block 270 of the process flow 200, modifications to the software code that change a risk category of the software application are flagged. For example, computer-executable instructions of one or more risk comparison module(s) stored at a remote server may be executed to identify a portion of software code that was modified, added, or removed, and that may therefore have caused the change in risk category. For example, if the application is handling a previously unhandled data type, such handling may increase a risk score or risk category for the application.

Figure 3:
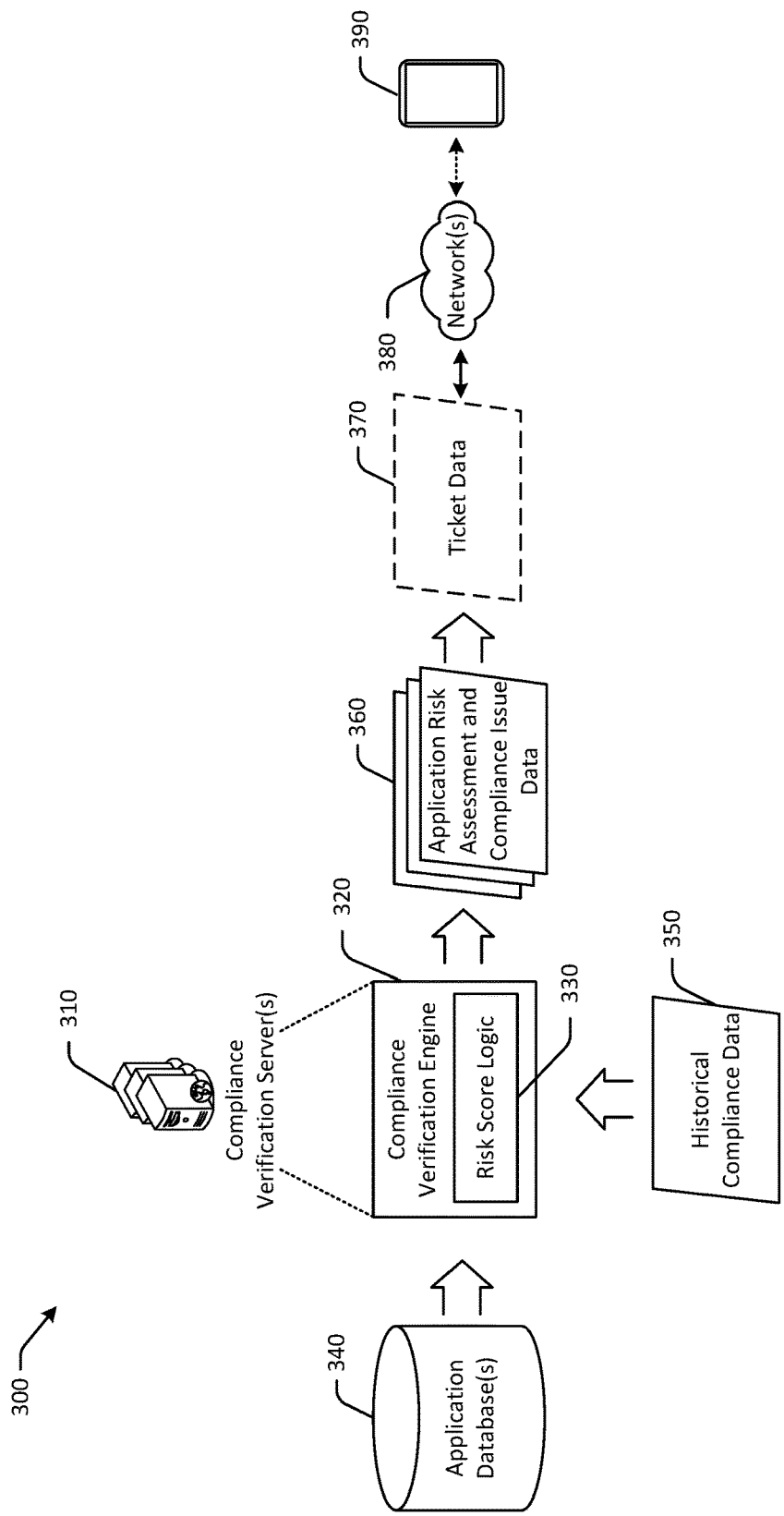
FIG. 3 is an example hybrid system and process flow diagram for automated sensitive information and data storage compliance verification in accordance with one or more embodiments of the disclosure.

FIG. 3 depicts an example hybrid system and process flow diagram 300 for automated sensitive information and data storage compliance verification in accordance with one or more embodiments of the disclosure. In FIG. 3, one or more compliance verification servers 310 may include a compliance verification engine 320 with risk score logic 330. The compliance verification server 310 may be in communication with one or more application databases 340 that include software code for software applications, software components, and related information, such as design documents, plans, updates, and the like.

The compliance verification engine 320 may be executed to determine compliance of one or more software applications, components of software applications, software suites, and the like. The compliance verification engine 320 may verify compliance and/or determine risk scores for locally or remotely accessible software. In some embodiments, the compliance verification engine 320 may be a separate stand-alone tool that can be used by developers or other users to verify compliance on demand.

The remote server 310 may be in communication with the application database 340. The application database 340 may include one or more repositories for software code associated with different software components and/or software applications, as well as related information, including design documents, updates, data logs, and the like. Data logs, code, snippets, and design documents may be available at the application database 340 or another database and may be analyzed or otherwise considered in determining compliance levels and/or risk scores.

The compliance verification server 310 may determine or otherwise receive or access, for example from one or more historical datastores, historical compliance data 350. The historical compliance data 350 may include previously generated or determined risk scores and/or compliance levels for a software component and/or risk scores for a particular software application. The historical compliance data 350 may include a length of time a compliance issue has been outstanding, information related to team members, risk scores for applications previously worked on by certain team members, and other information. For example, the historical compliance data 350 may include data related to historical compliance of different users, different teams, different business units, and the like.

Using the data from the campaign database 340 and the historical compliance data 350, the compliance verification engine 320 may generate application risk assessment and compliance issue data 360. The application risk assessment and compliance issue data 360 may include a risk assessment for various software components and/or a software application, as well as compliance issue data and/or compliance level information. In some embodiments, the application risk assessment and compliance issue data 360 may include graphical indicators representing where an application falls as far as risk level and/or compliance level.

The compliance verification engine 320 may determine a risk score or risk indicator for a software application. In some embodiments, the compliance verification engine 320 may determine one or more risk subscores for software components of the software application. The one or more risk subscores may be used to determine an aggregate risk score for the software application. The compliance verification engine 320 may implement the risk score logic 330 to determine risk subscores and/or risk scores.

In one example, the compliance verification engine 320 may determine a software application stored at a database. For example, the compliance verification engine 320 may identify a software application stored at the application database 340 using an application identifier. The compliance verification engine 320 may determine software code of the software application. For example, the compliance verification engine 320 may determine a file that has software code for the software application using the application identifier. The file may be stored at the application database 340. The compliance verification engine 320 may access the historical compliance data 350 for the application using the application identifier, as well as, in some instances, historical compliance data for the team and/or team members working on the application. The compliance verification engine 320 may output the application risk assessment and compliance issue data 360 for the application. For example, the compliance verification engine 320 may verify IP address rule compliance for the application. The compliance verification engine 320 may determine that the software code of the application includes a function that accesses critical information, which may be the IP address, of a user or user device, and may therefore check the application for IP address rule compliance, which may be to limit an amount of IP address accessed or stored by the application.

The compliance verification engine 320 may determine a design document that includes design information for the software application. The compliance verification engine 320 may extract text from the design document and may determine a meaning of the text, for example using natural language processing or another suitable technique. The compliance verification engine 320 may determine that the meaning is associated with a compliance issue or a potential compliance issue, such as an IP address, personally identifiable information, use of certain datastores, etc., and may flag or mark the software application and/or generate a notification message indicative of the potential compliance issue, so as to notify one or more owners of the potential compliance issue.

Using the application risk assessment and compliance issue data 360, the compliance verification engine 320 may optionally generate ticket data 370. Ticket data 370 may be one or more tickets or other notifications indicative of existing compliance issues or warnings of potential compliance issues for a respective software application or component. For example, if the compliance verification engine 320 determines that a software application is storing full IP addresses for unlimited lengths of time, a ticket to resolve this compliance issue may be generated with the ticket data 370. In some embodiments, the application risk assessment and compliance issue data 360 may be manually reviewed and/or approved to determine whether any ticket data 370 is to be generated as a result of the application risk assessment and compliance issue data 360. Ticket data 370 may be fingerprinted or associated with a unique identifier to track resolution.

In an example, a design document may indicate that a software developer plans to use a specific datastore to store a customer identifier. If that specific datastore is not configured or rated to store customer identifiers, a ticket may be generated for the application and/or sent to the developer. In another example, if a team is associated with a number of high risk applications, and another application is submitted for review by the same team, that application may be subject to higher scrutiny or may be more likely to be flagged due to the team's historical compliance performance.

The ticket data 370 may be sent to one or more owners or other entities associated with the software application so as to indicate that the issue exists or that there is a potential issue. The risk scores or risk indicators may also be sent to the owners or other entities. For example, the ticket data 370 may be communicated to one or more user devices 390 associated with the owners of the application via one or more networks 380.

Figure 4:
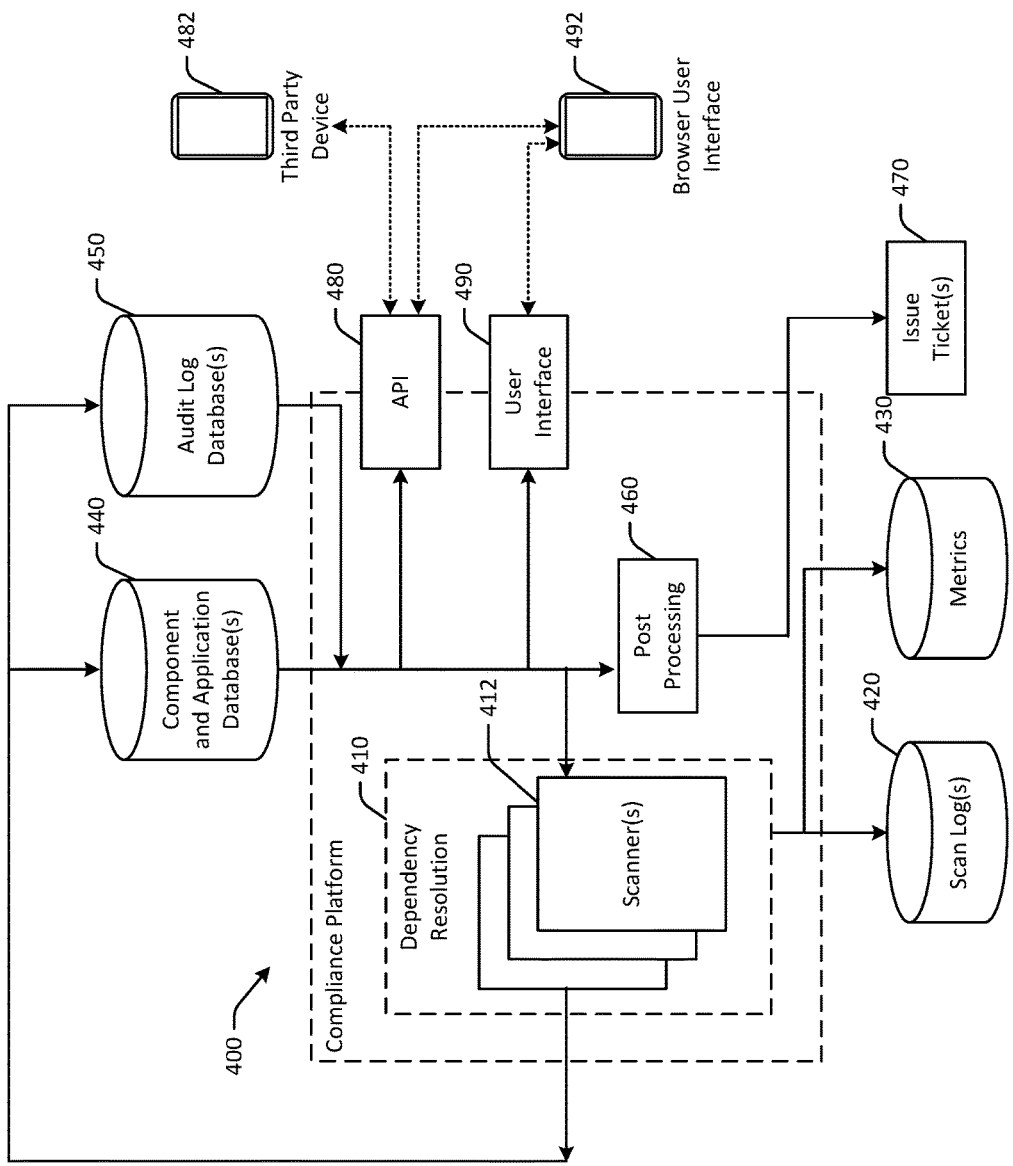
FIG. 4 is an example data flow schematic diagram for automated sensitive information and data storage compliance verification in accordance with one or more embodiments of the disclosure.

FIG. 4 is an example data flow including a compliance platform 400 in a schematic diagram for automated sensitive information and data storage compliance verification in accordance with one or more embodiments of the disclosure.

The compliance platform 400 may communicate with one or more devices and/or datastores and may be configured to determine or verify compliance of software applications. The compliance platform 400 may be a single repository for compliance information. The compliance platform 400 may include a backend component that collects and amalgamates data from disparate sources. The compliance platform 400 may include a frontend for compliance reviewers and developers. Other embodiments of compliance platforms may include additional or fewer, or different, components.

The compliance platform 400 may include a dependency resolution component 410 with one or more scanners 412. Scanners 412 may be configured to scan one or more software components or software applications to identify potential compliance issues and/or to determine risk scores. The scanners 412 may collect raw data, differentiate against backed up or stored data, and determine changes that have been made. The scanners 412 may search for specific issues in source code, production logs, configurations, and the like. Scanned and/or collected data can include data access permissions, primary owner, inferred owners, component names, component statuses, compliance questionnaire submissions, notes, last scan date, and other information.

Examples of scanners 412 include data permissions scanners, IP address logging scanners, data retention scanners, and other scanners. In one example, a data permissions scanner may be used to determine whether an application accesses a certain data type, and/or whether any accessed data types may be associated with sensitive information. The scanner may search for IP addresses in log files. A data retention policy scanner may be used to determine how long data is retained as a result of certain applications. The scanner may programmatically access storage configurations to determine the retention periods that are being applied to production datasets.

In some embodiments, the compliance platform 400 may trace data flow in a neural graph. The compliance platform 400 may include a benchmark component, a risk assessment component, and/or one or more agents that analyze or scan data logs, software code, and other application aspects. For example, the compliance platform 400 may be in communication with one or more scan logs 420. The scan logs 420 may include output from the scanners 412, and may include identified compliance issues for certain applications, as well as other application related information and scanner output. The compliance platform 400 may be in communication with one or more metrics datastores 430 that may include metrics by which to evaluate or verify compliance. Metrics may include compliance associated with various data, such as metrics for IP addresses, metrics for user identifiers, and the like. Metrics may include a historical record of compliance issues, a worst offending team, a list of repeat offenders, a number of identified compliance issues, a number of applications in an alarm state today, a number of outstanding tickets being tracked, latency on tickets being resolved by teams, and the like.

The compliance platform 400 may use the scanners 412 to scan one or more component and application databases 440 and/or one or more audit log databases 450. The component and application database 440 may include code associated with components and/or software applications and may be checked for updates daily. The component and application database 440 may include design documents and the like that may be processed using natural language processing to determine potential compliance risks and/or compliance issues. The audit log database 450 may include previous audit data for specific applications or components.

The compliance platform 400 may perform post processing 460 using output from the dependency resolution 410 and/or the scanners 412. Post processing 460 may include determination of risk scores, determining compliance levels, generating graphical indicators, and the like. Post processing 460 may include filtering process to remove known false-positives. Using the post processing 460 output, the compliance platform 400 may issue tickets 470 flagging compliance issues or potential risks that can be addressed or reviewed manually.

The compliance platform 400 may communicate with one or more third party devices 482 using one or more application programming interfaces 480. The compliance platform 400 may share information and/or compliance verification data with third party devices 482. The compliance platform 400 may communicate with one or more browsers at a user interface 492 using one or more user interfaces 490 for direct communication with the compliance platform 400.

Figure 5:
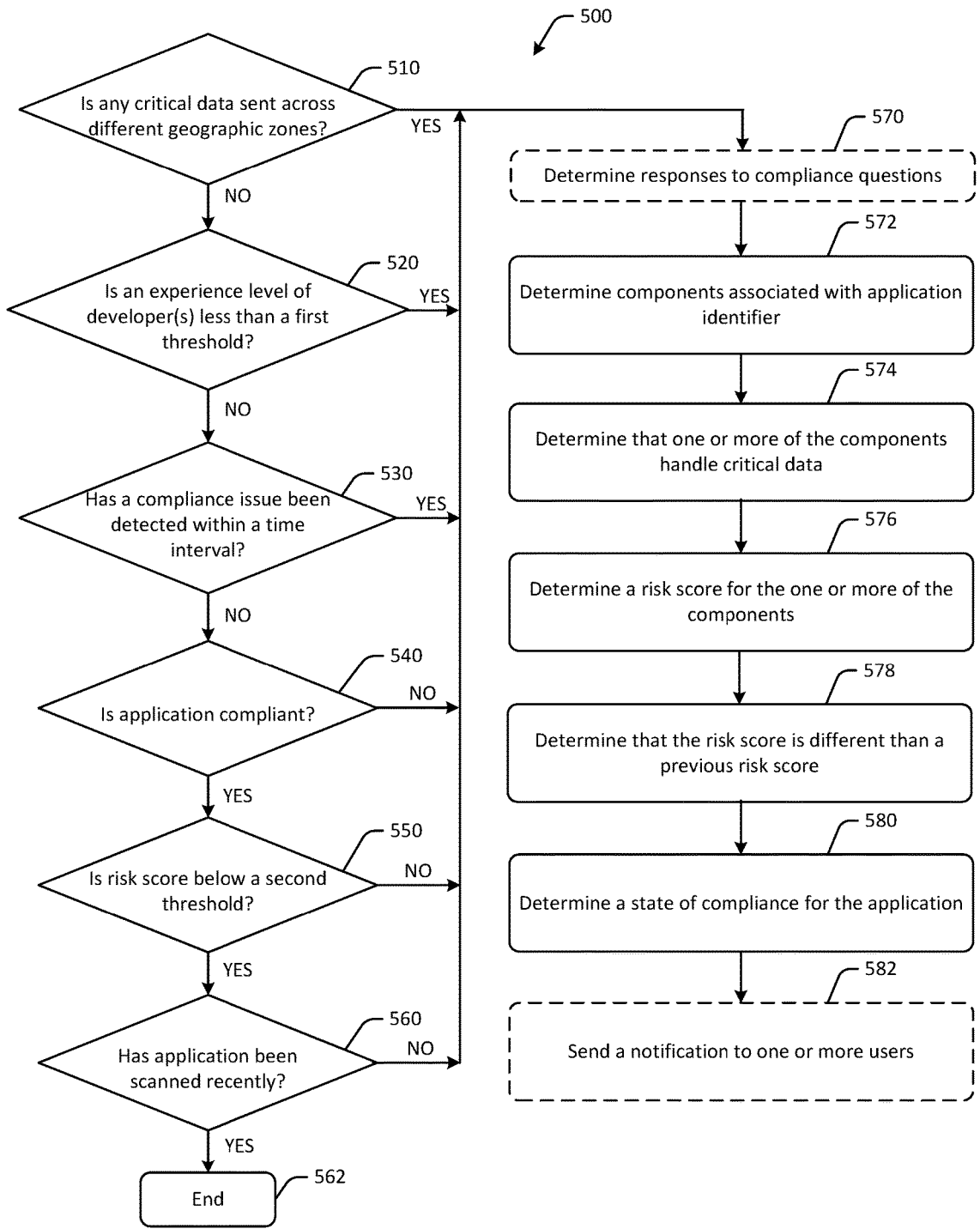
FIG. 5 is an example process flow diagram for automated sensitive information and data storage compliance verification in accordance with one or more embodiments of the disclosure.

FIG. 5 depicts an example process flow 500 for automated sensitive information and data storage compliance verification in accordance with one or more embodiments of the disclosure. Any of the operations illustrated in FIG. 5 may be performed in any order and/or concurrently or partially concurrently. Other embodiments may include additional or fewer operations.

At determination block 510 of the process flow 500, a determination is made as to whether any critical data is sent across different geographic zones. If critical data or sensitive data is sent from a Europe geographic zone to a North America geographic zone, the determination at determination block 510 may be positive. For example, critical information of a user may be generated at a first geographic location with first compliance rules, such as in the United States. If the critical information is sent to a second geographic location with second compliance rules, such as Europe, a prioritization between the compliance rules may be determined. Prioritization may be based at least in part on an origination or destination of the critical data, regulations, and other factors. The prioritized compliance rules may be used to determine compliance issues and/or risk scores for applications. If it is determined that critical data is sent across different geographic zones, the process flow 500 may proceed to optional block 570. If it is determined at determination block 510 that critical data is not sent across different geographic zones, the process flow 500 may proceed to determination block 520.

At determination block 520, a determination is made as to whether an experience level of one or more developers or owners is less than a first threshold. An experience level may be a number of years of experience, an average years of experience (e.g., average years across one or more teams, one or more software developers associated with development of the application or a component of the application, etc.) previous applications developed by one or more users or teams, a minimum or maximum years of experience of one or more developers or users associated with the application, experience of parties related to one or more developers or users associated with the application, a level of training of one or more users associated with the application, an elapsed time since training for those users that have been trained, etc. For example, the first threshold may be a certain title, such as senior developer, or a number of years of experience, or another metric. The experience level may be determined based at least in part on the team that owns the application and/or works or develops the application. In one example, a number of owners (primary and/or inferred) of the software application may be determined. An average experience value for owners may be determined and used in determining the risk score for the software application. In some embodiments, the primary owners experience and/or title may be used to determine a risk score. Factors such as privacy training for team members may be considered as part of the average experience. A number of changes made to the application by respective team members may be weighted in determining risk scores. For example, if the primary owner is making the majority of changes and the primary owner is well experienced, the risk score may not be affected negatively even if the team members have no experience. If it is determined that the average experience is less than the first threshold, the process flow 500 may proceed to optional block 570. If it is determined at determination block 520 that the average experience is not less than the first threshold, the process flow 500 may proceed to determination block 530.

At determination block 530, a determination is made as to whether a compliance issue has been detected for the software application within a time interval. The time interval may be a predetermined time interval, such as the last 30 days, the last 90 days, or another time interval. If it is determined that a compliance issue has been detected for the application within the time interval, the process flow 500 may proceed to optional block 570. If it is determined at determination block 530 that a compliance issue has not been detected within the time interval, the process flow 500 may proceed to determination block 540.

At determination block 540, a determination is made as to whether the application is compliant. If the application is not fully compliant, the process flow 500 may proceed to optional block 570. If it is determined at determination block 540 that the application is not compliant, the process flow 500 may proceed to determination block 550.

At determination block 550, a determination is made as to whether the risk score for the application is below a second threshold. The second threshold may be, for example, a medium risk threshold. If the risk score for the application is not less than the second threshold, the process flow 500 may proceed to optional block 570. If it is determined at determination block 550 that the risk score for the application is below the second threshold, the process flow 500 may proceed to determination block 560.

At determination block 560, a determination is made as to whether the application has been scanned recently. Recently may be, for example, within 24 hours, within 30 days, or within another short preceding timeframe. If the application has not been scanned recently, the process flow 500 may proceed to optional block 570. If it is determined at determination block 560 that the application has been scanned recently, the process flow 500 may end at block 562. The application may be determined to be compliant and/or have a risk score that is sufficiently low.

At optional block 570, responses to compliance questions, such as the questions presented in the example of FIG. 1, may be determined. In some embodiments, information may be automatically determined and therefore there may not be any responses to questions.

At block 572, components associated with an application identifier may be determined. At block 574, a determination may be made that one or more of the components handles critical or sensitive data. At block 576, a risk score for the one or more components may be determined. At block 578, it may be determined that the risk score is different than a previous risk score for the respective component and/or application. At block 580, a state of compliance for the application, such as fully compliant, partially compliant, or noncompliant, may be determined. At optional block 582, a notification may be sent to one or more users. The notification may be indicative of the risk score and/or the state of compliance.

One or more operations of the method, process flows, or use cases of FIGS. 1-5 may have been described above as being performed by a user device, or more specifically, by one or more program module(s), applications, or the like executing on a device. It should be appreciated, however, that any of the operations of methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
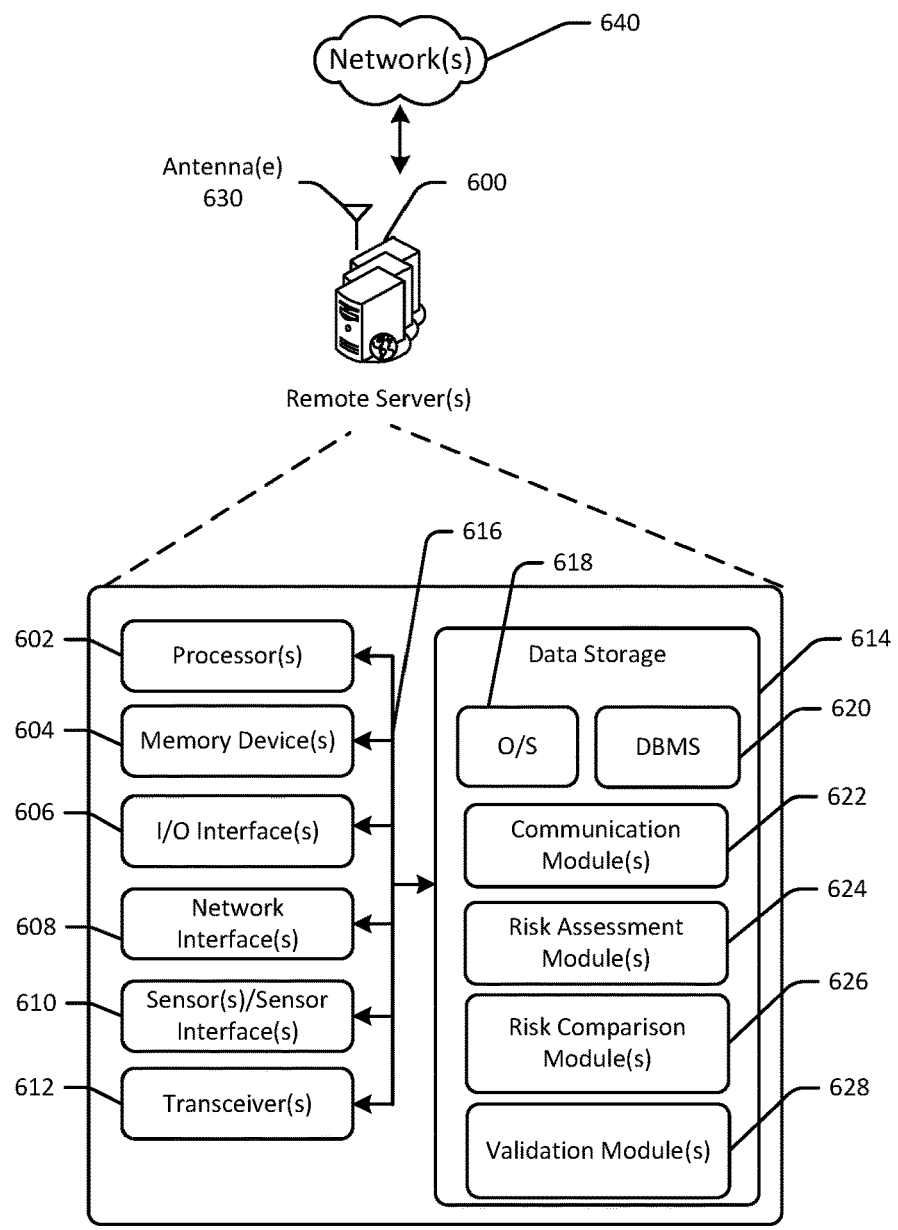
FIG. 6 schematically illustrates an example architecture of a system in accordance with one or more embodiments of the disclosure.

FIG. 6 is a schematic block diagram of one or more illustrative remote server(s) 600 in accordance with one or more example embodiments of the disclosure. The remote server(s) 600 may include any suitable computing device including, but not limited to, a server system, a mobile device such as a smartphone, a tablet, an e-reader, a wearable device, or the like; a desktop computer; a laptop computer; a content streaming device; a set-top box; or the like. The remote server(s) 600 may correspond to an illustrative device configuration for the compliance verification servers of FIGS. 1-5.

The remote server(s) 600 may be configured to communicate via one or more networks with one or more servers, user devices, or the like. The remote server(s) 600 may be configured to actively or passively verify compliance of one or more software applications, business units, aggregate software and data retention, and the like. The remote server(s) 600 may be configured to analyze software code and related design documents to identify potential risk areas and/or lines of software code that may increase a compliance risk for software applications and/or business units. In some embodiments, a single remote server or single group of remote servers may be configured to perform more than one type of compliance verification functionality.

The remote server(s) 600 may be configured to communicate via one or more networks 640. Such network(s) 640 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 640 may have any suitable communication range associated therewith and may include, for example, global networks (e.g., the Internet), metropolitan area networks (MANs), wide area networks (WANs), local area networks (LANs), or personal area networks (PANs). In addition, such network(s) 640 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server(s) 600 may include one or more processors (processor(s)) 602, one or more memory devices 604 (generically referred to in this section as memory 604), one or more input/output ("I/O") interface(s) 606, one or more network interface(s) 608, one or more sensors or sensor interface(s) 610, one or more transceivers 612, and data storage 614. The remote server(s) 600 may further include one or more buses 616 that functionally couple various components of the remote server(s) 600. The remote server(s) 600 may further include one or more antenna(e) 630 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 616 may include at least one of a system bus, a memory bus, an address bus, or a message bus, and may permit the exchange of information (e.g., data (including computer-executable code), signaling, etc.) between various components of the remote server(s) 600. The bus(es) 616 may include, without limitation, a memory bus or a memory controller, a peripheral bus, an accelerated graphics port, and so forth. The bus(es) 616 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the remote server(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 614 may include removable storage and/or non-removable storage including, but not limited to, magnetic storage, optical disk storage, and/or tape storage. The data storage 614 may provide non-volatile storage of computer-executable instructions and other data. The memory 604 and the data storage 614, removable and/or non-removable, are examples of computer-readable storage media (CRSM) as that term is used herein.

The data storage 614 may store computer-executable code, instructions, or the like that may be loadable into the memory 604 and executable by the processor(s) 602 to cause the processor(s) 602 to perform or initiate various operations. The data storage 614 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to data storage 614 for non-volatile storage.

More specifically, the data storage 614 may store one or more operating systems (O/S) 618; one or more database management systems (DBMS) 620; and one or more program module(s), applications, engines, computer-executable code, scripts, or the like such as, for example, one or more communication module(s) 622, one or more risk assessment module(s) 624, one or more risk comparison module(s) 626, and/or one or more validation module(s) 628. Some or all of these module(s) may be or include sub-module(s). Any of the components depicted as being stored in data storage 614 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 614 may support the functionality described in reference to the corresponding components named earlier in this disclosure.

The data storage 614 may further store various types of data utilized by the components of the remote server(s) 600. Any data stored in the data storage 614 may be loaded into the memory 604 for use by the processor(s) 602 in executing computer-executable code. In addition, any data depicted as being stored in the data storage 614 may potentially be stored in one or more datastore(s) and may be accessed via the DBMS 620 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, an example datastore(s) may include, for example, specific repositories associated with software applications, datastore content settings (e.g., what information is stored at a particular datastore, etc.), and other information.

The processor(s) 602 may be configured to access the memory 604 and execute computer-executable instructions loaded therein. For example, the processor(s) 602 may be configured to execute computer-executable instructions of the various program module(s), applications, engines, or the like of the remote server(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the communication module(s) 622 may include computer-executable instructions, code, or the like that responsive to execution by one or more of the processor(s) 602 may perform functions including, but not limited to, communicating with remote servers, communicating with remote datastores, communicating with local servers or devices on an intranet, sending or receiving information and instructions, and the like.

The risk assessment module(s) 624 may include computer-executable instructions, code, or the like that responsive to execution by one or more of the processor(s) 602 may perform functions including, but not limited to, generating risk scores, determining risk levels and/or risk states, determining changes in risk level or risk state, determining changes to software applications, determining when to flag software applications, flagging software applications, determining compliance, and the like.

The risk comparison module(s) 626 may include computer-executable instructions, code, or the like that responsive to execution by one or more of the processor(s) 602 may perform functions including, but not limited to, determining whether a change to software affects a risk level or compliance rating, determining whether to change a risk level or risk state, determining whether to change a compliance rating, determining compliance, and the like.

The validation module(s) 628 may include computer-executable instructions, code, or the like that responsive to execution by one or more of the processor(s) 602 may perform functions including, but not limited to, determining whether software satisfies a compliance requirement(s), determining whether a risk level exceeds a threshold, determining whether to validate software, determining whether to publish or deploy software, determining a change in compliance, generating compliance notifications, and the like.

Referring now to other illustrative components depicted as being stored in the data storage 614, the O/S 618 may be loaded from the data storage 614 into the memory 604 and may provide an interface between other application software executing on the remote server(s) 600 and the hardware resources of the remote server(s) 600. More specifically, the O/S 618 may include a set of computer-executable instructions for managing the hardware resources of the remote server(s) 600 and for providing common services to other application programs (e.g., managing memory allocation among various application programs). In certain example embodiments, the O/S 618 may control execution of the other program module(s) to dynamically enhance characters for content rendering. The O/S 618 may include any operating system now known or which may be developed in the future including, but not limited to, any server operating system, any mainframe operating system, or any other proprietary or non-proprietary operating system.

The DBMS 620 may be loaded into the memory 604 and may support functionality for accessing, retrieving, storing, and/or manipulating data stored in the memory 604 and/or data stored in the data storage 614. The DBMS 620 may use any of a variety of database models (e.g., relational model, object model, etc.) and may support any of a variety of query languages. The DBMS 620 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 600 is a mobile device, the DBMS 620 may be any suitable light-weight DBMS optimized for performance on a mobile device.

Referring now to other illustrative components of the remote server(s) 600, the input/output (I/O) interface(s) 606 may facilitate the receipt of input information by the remote server(s) 600 from one or more I/O devices as well as the output of information from the remote server(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 630 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The remote server(s) 600 may further include one or more network interface(s) 608 via which the remote server(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(e) 630 may include any suitable type of antenna depending, for example, on the communications protocols used to transmit or receive signals via the antenna(e) 630. Non-limiting examples of suitable antennae may include directional antennae, non-directional antennae, dipole antennae, folded dipole antennae, patch antennae, multiple-input multiple-output (MIMO) antennae, or the like. The antenna(e) 630 may be communicatively coupled to one or more transceivers 612 or radio components to which or from which signals may be transmitted or received.

As previously described, the antenna(e) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 630 may additionally, or alternatively, include a Wi-Fi antenna configured to transmit or receive signals in accordance with established standards and protocols, such as the IEEE 1002.11 family of standards, including via 2.4 GHz channels (e.g., 1002.11b, 1002.11g, 1002.11n), 5 GHz channels (e.g., 1002.11n, 1002.11ac), or 60 GHz channels (e.g., 1002.11ad). In alternative example embodiments, the antenna(e) 630 may be configured to transmit or receive radio frequency signals within any suitable frequency range forming part of the unlicensed portion of the radio spectrum.

The antenna(e) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 630—transmitting or receiving radio frequency (RF) signals in the bandwidth and/or channels corresponding to the communications protocols utilized by the remote server(s) 600 to communicate with other devices. The transceiver(s) 612 may include hardware, software, and/or firmware for modulating, transmitting, or receiving, potentially in cooperation with any of antenna(e) 630, communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the remote server(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 6 as being stored in the data storage 614 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 600, and/or hosted on other computing device(s) accessible via one or more networks, may be provided to support the functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server(s) 600 may include alternate and/or additional hardware, software, or firmware components beyond those described or depicted without departing from the scope of the disclosure. More particularly, it should be appreciated that software, firmware, or hardware components depicted as forming part of the remote server(s) 600 are merely illustrative and that some components may not be present or additional components may be provided in various embodiments. While various illustrative program module(s) have been depicted and described as software module(s) stored in the data storage 614, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps That which is claimed is:

1. A method comprising:
   determining, by one or more computer processors coupled to at least one memory, a first application identifier of an application for verifying internet protocol (IP) address rule compliance;
   determining a file comprising software code using the first application identifier;
   determining that a function implemented by the software code of the file accesses an IP address of a user device that is accessing a remote server;
   determining that the function stores a complete IP address of the user device;
   accessing a data log of data stored as a result of the function;
   determining that the data log comprises the complete IP address;
   determining that the software code includes a compliance issue;
   determining a first risk score for the software code using the data log;
   classifying the software code in a first category using the first risk score;
   generating a notification indicating the compliance issue and the first category classification;
   generating a first recommendation to delete the complete IP address;
   determining that the software code of the file has been modified;
   determining that the function stores a partial IP address;
   determining that the complete IP address is deleted;
   determining a second risk score for the software code of the file after the software code has been modified; and
   classifying the software code in a second category.

2. The method of claim 1, wherein the function is a first function, the method further comprising:
   accessing a repository storing the file;
   determining that the file has been modified;
   determining a second function implemented by the software code accesses website context information;
   determining that the second function stores the website context information;
   determining that the second function violates a data retention rule;
   flagging the second function; and
   generating a flagging notification for an owner of the file indicating that the second function violates the data retention rule.

3. The method of claim 1, further comprising:
   determining that the application has permission to access anonymized data;
   determining, using the software code, a retention time that data stored in the data log will be retained;
   determining that the retention time is indefinite; and
   generating a second recommendation for the retention time.

4. The method of claim 1, further comprising:
   determining a primary owner of the application;
   determining a first experience level of the primary owner;
   determining a set of inferred owners of the application;
   determining a second experience level of the set of inferred owners;
   determining a risk score history for the application; and
   determining a second risk score for the application using the first experience level, the second experience level, and the risk score history.

5. A method comprising:
   determining, by one or more computer processors coupled to at least one memory, a software application stored at a database;
   analyzing software code of the software application;
   determining that the software code comprises a function that accesses user-specific information;
   determining a first risk score for the software application based at least in part on the function;
   determining a compliance level for the software application based at least in part on the function;
   determining a first risk category for the software application using the first risk score;
   monitoring the software application for updated software code;
   determining that the software code has been modified;
   determining a second risk score for the software application after the software code has been modified; and
   determining a second risk category for the software application using the second risk score.

6. The method of claim 5, further comprising:
   determining that the first risk score satisfies a high risk application threshold; and
   generating a high risk notification for an owner user account of the software application.

7. The method of claim 5, further comprising:
   determining that the function violates a compliance rule;
   determining that the software application comprises a compliance issue; and
   generating a compliance issue notification for an owner user account of the software application.

8. The method of claim 5, further comprising:
   determining a risk subscore for the function, wherein determining the first risk score for the software application based at least in part on the function comprises determining the first risk score for the software application based at least in part on the function and the risk subscore.

9. The method of claim 5, further comprising:
   determining that the user-specific information is generated at a first geographic location with first compliance rules;
   determining that the user-specific information is sent to a second geographic location with second compliance rules; and
   determining that the second compliance rules are prioritized over the first compliance rules;
   wherein determining the first risk score for the software application based at least in part on the function comprises determining the first risk score for the software application based at least in part on the function and the second compliance rules; and
   wherein determining the compliance level for the software application based at least in part on the function comprises determining the compliance level for the software application based at least in part on the function and the second compliance rules.

10. The method of claim 5, further comprising:
    determining a number of users associated with development of the software application; and
    determining an experience level for the users;
    wherein determining the first risk score for the software application based at least in part on the function comprises determining the first risk score for the software application based at least in part on the function, the number of users, and the experience level.

11. The method of claim 5, wherein the software code is first software code stored in a file, the method further comprising:
    determining that the file has been modified with second software code;
    determining that the second software code modifies the function;
    determining that the second risk category is different than the first risk category; and
    generating a notification for an owner user account of the software application.

12. The method of claim 5, further comprising:
    determining a design document comprising design information for the software application;
    determining text from the design document;
    determining a meaning of the text using natural language processing;
    determining that the meaning is associated with a compliance issue; and
    associating the software application with a notification of the compliance issue.

13. The method of claim 5, further comprising:
    determining that the user-specific information is stored at a datastore;
    determining that a retention time of data stored at the datastore exceeds a retention time rule associated with the user-specific information; and
    generating a modification recommendation for the function.

14. The method of claim 5, further comprising:
    determining that the software application is associated with an encryption key to access the user-specific information.

15. The method of claim 5, the method further comprising:
    determining that the user-specific information is stored at a datastore;
    determining that storing the critical user information violates a compliance rule, or determining that the first risk score satisfies a high risk threshold; and
    identifying the software application for manual review.

16. The method of claim 5, further comprising:
    determining an aggregate risk score for the software application at a predetermined time interval; and
    determining an aggregate compliance level for the software application at the predetermined time interval.

17. A device comprising:
    at least one memory that stores computer-executable instructions; and
    at least one processor configured to access the at least one memory and execute the computer-executable instructions to:
        determine a software application stored at a database;
        analyze software code of the software application;
        determine that the software code comprises a function that accesses user-specific information;
        determine a first risk score for the software application based at least in part on the function;
        determine a compliance level for the software application based at least in part on the function;
        determine a first risk category for the software application using the first risk score;
        monitor the software application for updated software code;
        determine that the software code has been modified;
        determine a second risk score for the software application after the software code has been modified; and
        determine a second risk category for the software application using the second risk score.

18. The device of claim 17, wherein the at least one processor is further configured to access the at least one memory and execute the computer-executable instructions to:
    determine that the function violates a compliance rule;
    determine that the software application comprises a compliance issue; and
    generate a compliance issue notification for an owner user account of the software application.

19. The device of claim 17, wherein the at least one processor is further configured to access the at least one memory and execute the computer-executable instructions to:
    determine a number of users associated with development of the software application; and
    determine an experience level for the users;
    wherein the at least one processor is configured to determine the first risk score for the software application based at least in part on the function by determining the first risk score for the software application based at least in part on the function, the number of users, and the experience level.

20. The device of claim 17, wherein the software code is first software code stored in a file, and wherein the at least one processor is further configured to access the at least one memory and execute the computer-executable instructions to:
    determine that the file has been modified with second software code;
    determine that the second software code modifies the function;
    determine that the second risk category is different than the first risk category; and
    generate a notification for an owner user account of the software application.

* * * * *